(No Model.)
J. C. BOOTH.
CHAIN PIPE WRENCH.
No. 542,136. Patented July 2, 1895.
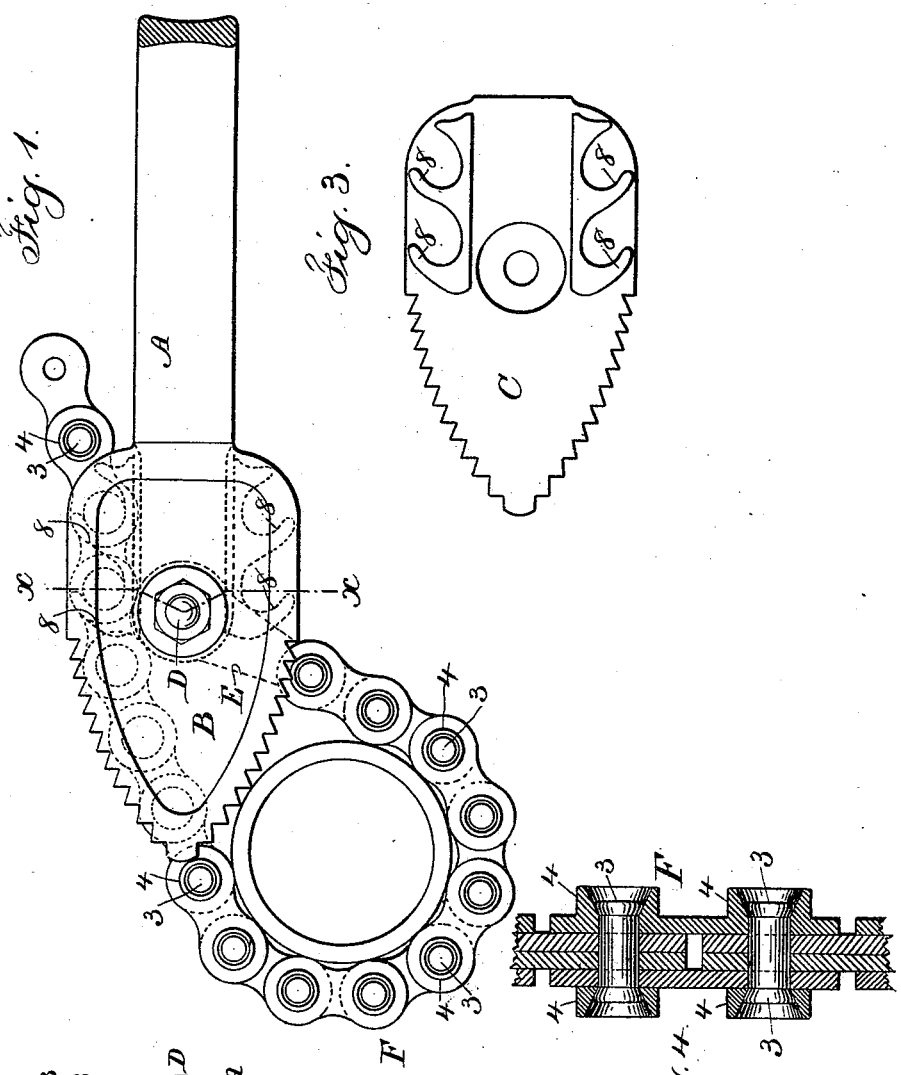

UNITED STATES PATENT OFFICE.

JOHN C. BOOTH, OF BROOKLYN, NEW YORK, ASSIGNOR TO J. H. WILLIAMS & CO., OF SAME PLACE.

CHAIN PIPE-WRENCH.

SPECIFICATION forming part of Letters Patent No. 542,136, dated July 2, 1895.

Application filed May 2, 1894. Serial No. 509,746. (No model.)

*To all whom it may concern:*

Be it known that I, JOHN C. BOOTH, a citizen of the United States, residing at Brooklyn, in the county of Kings and State of New York, have invented an Improvement in Chain Pipe-Wrenches, of which the following is a specification.

Wrenches have been constructed in which a chain fastened at one end has been combined with jaws having teeth or serrations to come into contact with the pipe, the chain being wrapped around the pipe and removably connected with the lever or with the faces of the jaws. In some instances the pivot-pins of the plate-links on the chain have extended beyond the faces of the links to form projections that interlock with hooks upon the interior faces of the jaws, and in other instances the links of the chain have been made with crescent-shaped projections to engage pins projecting inwardly upon the faces of the jaws.

My present improvements are made with reference to more firmly supporting the pivot-pins and forming bearings around such pivot-pins to engage the hook-shaped projections upon the interior faces of the jaws, thereby lessening the strain upon the pivot-pins themselves and allowing the ends of the pivots to be riveted up in recesses within circular projections to firmly hold the links.

In the drawings, Figure 1 is a side elevation of the wrench with the handle broken off. Fig. 2 is a cross-section at the line $x\ x$. Fig. 3 is an elevation of the inner face of one of the jaws detached. Fig. 4 is a section, in larger size, through some of the links of the chain.

The lever-handle A and the jaws B C are constructed in a similar manner to the same parts represented in Letters Patent No. 499,508, granted June 13, 1893, to J. C. Booth and W. C. Redfield—that is to say, the jaws B C are serrated upon their edges and recessed in their inner faces for the reception of the circular lugs 6 upon the handle, and these parts are connected together by the bolt or rivet D, and the chain F is provided with an end link which passes into a slot at the end of the handle-bar A, and through the end link E of the chain the bolt or rivet passes, and such bolt or rivet becomes a pivot upon which the end link of the chain can be swung.

In the construction of the chain F, I make use of plate-links set together in pairs, and the pivot-pins 3 pass through the links to connect them together, and such pivot-pins project beyond the outer faces of the outer links, and upon these outer faces of the outer links there are circular projections 4, either integral with the outer links themselves or in the form of washers, as represented in Fig. 4, there being conical recesses and countersinks in these circular projections, into which the ends of the pivot-pins 3 are spread as such pins are riveted up to secure the links together. These circular projections 4 interlock with the hook-shaped projections 8 upon the interior faces of the jaws B and C, and these projections, being cylindrical and parallel, take an even bearing upon the interior faces of the hook-shaped projections 8, and when such circular projections are integral with the links they lessen the strain upon the pivot-pins, and, whether integral or as separate washers, the conical recesses of these projections receive the heads of the pivot-pins as they are spread in riveting up such pivot-pins, and the chain can be made very strong, and the links are not liable to wear loose or the plates of the links to spread apart one from the other under the strain to which they are subjected, because the riveted heads of the pivot-pins closely confine the parts in their proper relation to one another. Thus the difficulty resulting from the pivots becoming loose is effectually prevented.

I remark that the projections 8 are integral with the jaws and are made of the proper proportionate strength for supporting the strain upon the chain when the wrench is employed for rotating a pipe or rod, and it is advantageous that these projections 8 should be made hook-shaped, as represented, so as to lessen the risk of the circular projections 4 slipping out from between the hook-shaped projections 8 and thereby allowing the chain to disengage from the jaws of the wrench.

The serrations of the jaws, when provided at both sides of such jaws, allow for the chain being wrapped around the pipe in either direction. I, however, remark that it is not necessary to have serrations on both edges of the respective jaws, as one edge of each jaw might be smooth if so desired.

I claim as my invention—

1. The chain for chain wrenches composed of plate links united by pivot pins that pass through the links, the outer links of the chain having integral circular projections around the ends of the pivot pins, the heads of the pivot pins being riveted up within the countersunk recesses in the circular projections, substantially as specified.

2. The chain for chain wrenches, composed of plate links united by pivot pins that pass through the links, the outer links of the chain having circular projections around the ends of the pivot pins formed of separate washers, the heads of the pivot pins being riveted up within the countersunk recesses of the washers, substantially as set forth.

Signed by me this 26th day of April, 1894.

JOHN C. BOOTH.

Witnesses:
F. G. PITCHER,
LOUIS A. WENDT.